US008704676B2

(12) United States Patent
Hawkes et al.

(10) Patent No.: US 8,704,676 B2
(45) Date of Patent: Apr. 22, 2014

(54) DYNAMIC ROAD MARKERS TO PROVIDE VISUAL FEEDBACK AS TO VEHICLE SPEED

(75) Inventors: Philip Hawkes, Warrimoo (AU); Craig M. Brown, Harbord (AU)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 13/206,353

(22) Filed: Aug. 9, 2011

(65) Prior Publication Data

US 2013/0038461 A1 Feb. 14, 2013

(51) Int. Cl.

| | |
|---|---|
| ***G08B 5/00*** | (2006.01) |
| ***G08G 1/01*** | (2006.01) |
| ***B60Q 7/00*** | (2006.01) |

(52) U.S. Cl.

USPC ................ 340/815.4; 340/815.45; 340/908.1; 340/905; 340/936; 340/932; 340/985; 340/331; 701/119; 60/612

(58) Field of Classification Search

USPC .................................... 340/815.4, 936, 908.1

See application file for complete search history.

(56) References Cited

U.S. PATENT DOCUMENTS

| | | | |
|---|---|---|---|
| 3,750,099 A | 7/1973 | Proctor | |
| 3,872,423 A | 3/1975 | Yeakley | |
| 3,938,080 A | 2/1976 | Hulme | |
| 5,134,393 A * | 7/1992 | Henson | 340/933 |
| 5,552,767 A | 9/1996 | Toman | |
| 5,673,039 A | 9/1997 | Pietzsch et al. | |
| 5,760,686 A | 6/1998 | Toman | |
| 6,559,774 B2 | 5/2003 | Bergan et al. | |
| 6,900,740 B2 | 5/2005 | Bloomquist et al. | |
| 7,019,669 B1 | 3/2006 | Carr | |
| 7,021,857 B2 | 4/2006 | Van | |
| 7,708,493 B2 | 5/2010 | Jung et al. | |

(Continued)

FOREIGN PATENT DOCUMENTS

| | | |
|---|---|---|
| GB | 2303906 A | 3/1997 |
| GB | 2341712 A | 3/2000 |

(Continued)

OTHER PUBLICATIONS

Eliasson J., et al., "Towards road surface monitoring: Experiments and technical challenges", Control Applications, (CCA) & Intelligent Control, (ISIC), 2009 IEEE, IEEE, Piscataway, NJ, USA, Jul. 8, 2009, pp. 655-659, XP031542868, ISBN: 978-1-4244-4601-8 abstract figure 4 p. 655, paragraph II.A p. 656, paragraph II.A-D p. 657, paragraph II.3 p. 659, paragraph IV.

(Continued)

*Primary Examiner* — Donnie Crosland

(74) *Attorney, Agent, or Firm* — Won Tae Kim

(57) ABSTRACT

Disclosed is an apparatus, system, and method to utilize road markers to control vehicle speeds. The road markers may be commanded to emit a light for a pre-determined period of time. Further, the road markers may be controlled such that they are commanded to emit the light based upon a timing sequence associated with a desired speed so that the road markers emit light in a strobe pattern. In this way, if a vehicle is traveling at the desired speed, then the strobe pattern appears static to a driver of the vehicle. Additionally, a message may be transmitted from a traffic authority to increase or decrease the timing sequence of the strobe pattern to increase or decrease the speed to the desired speed.

43 Claims, 9 Drawing Sheets

(56) References Cited

U.S. PATENT DOCUMENTS

| | | | |
|---|---|---|---|
| 7,755,510 | B2 | 7/2010 | Bilimoria et al. |
| 7,859,431 | B2 | 12/2010 | Peddie et al. |
| 7,877,187 | B2 | 1/2011 | Hori et al. |
| 8,154,424 | B2 * | 4/2012 | Selevan ......................... 340/907 |
| 2003/0063015 | A1 | 4/2003 | Ebner et al. |
| 2004/0127231 | A1 | 7/2004 | Dor et al. |
| 2005/0270175 | A1 | 12/2005 | Peddie et al. |
| 2006/0193691 | A1 | 8/2006 | Gonzalez et al. |
| 2007/0124306 | A1 | 5/2007 | Nelson |
| 2007/0211463 | A1 | 9/2007 | Chevalier et al. |
| 2007/0213088 | A1 | 9/2007 | Sink |
| 2009/0009089 | A1 | 1/2009 | Burkett |
| 2010/0156668 | A1 | 6/2010 | Lee |
| 2010/0201267 | A1 | 8/2010 | Bourquin et al. |
| 2011/0006912 | A1 | 1/2011 | Sheardown et al. |
| 2011/0068950 | A1 | 3/2011 | Flaherty |
| 2011/0084854 | A1 | 4/2011 | Johnson |
| 2011/0153742 | A1 | 6/2011 | Sloop et al. |
| 2012/0194353 | A1 | 8/2012 | Groves |
| 2012/0249341 | A1 | 10/2012 | Brown et al. |
| 2013/0013179 | A1 | 1/2013 | Lection et al. |
| 2013/0113618 | A1 | 5/2013 | Flanagan et al. |

FOREIGN PATENT DOCUMENTS

| | | | |
|---|---|---|---|
| WO | 8807560 | A1 | 10/1988 |
| WO | 9604632 | A1 | 2/1996 |
| WO | 9835328 | A2 | 8/1998 |
| WO | 0217266 | A2 | 2/2002 |
| WO | 2006091932 | A2 | 8/2006 |

OTHER PUBLICATIONS

International Search Report and Written Opinion—PCT/US2012/050169—ISA/EPO—Nov. 15, 2012.

Samardzija D., et al., "Road Nail: Intelligent road marking system testbed", Vehicular Networking Conference (VNC), 2010 IEEE, IEEE, Piscataway, NJ, USA, Dec. 13, 2010, pp. 134-138, XP031857811, ISBN: 978-1-4244-9526-9 abstract figures 1-3, 9 p. 134, paragraphs I,II p. 135, paragraph III.A p. 136, paragraph C p. 137, paragraph IV.

* cited by examiner

DYNAMIC ROAD MARKERS TO PROVIDE VISUAL FEEDBACK AS TO VEHICLE SPEED

BACKGROUND

1. Field

The present invention relates generally to an apparatus, system, and method to provide visual feedback as to vehicle speed.

2. Relevant Background

Today, highway and road traffic control is typically independently implemented by signs, lights, and visually by vehicle users and with very little or no intelligence-based system controls. Government agencies are aware of the increased safety and resulting cost saving potentials that are associated with making highways more intelligent and controlled. More informed and aware drivers will result in fewer traffic accidents, which in turn, results in less emergency response calls, less insurance claims, and great cost savings. One particular example of this is when drivers exceed a safe speed limit.

Further, thousands of people die or are seriously injured from traffic accidents when they could have been saved or had better outcomes if they were driving at a safe speed limit and/or emergency services could have arrived just a few minutes earlier. In addition, multiple vehicle accidents often occur because of the lack of warning of impending danger ahead from accidents or stopped traffic.

Speed limits are used to increase safety for vehicle drivers and passengers. Speed limits are typically indicated to drivers by statically located signs. Typically, these signs are fixed unchangeable signs (e.g., showing an unchangeable speed limit). However, some newer signs may be computer implemented and may be changed (e.g., showing a changeable speed limit). Vehicle drivers are responsible for noting their current speed by monitoring their vehicle's speedometer. This can be dangerous in that it takes the drivers attention from the road. As there is often some distance between speed limit indication signs, it is not always obvious what the current speed limit actually is.

Because vehicle speed is so important in preventing accidents based on either static conditions of the road (e.g., normal road conditions) or due to changing conditions of the road (e.g., a traffic accident, rock slide, etc.) it is desirable to provide a system to drivers such that drivers can easily determine if they are below, at, or above a desired speed limit, by the driver's observation of the road.

SUMMARY

Aspects of the invention relate to an apparatus, system, and method to utilize road markers to control vehicle speeds. The road markers may be commanded to emit a light for a predetermined period of time. Further, the road markers may be controlled such that they are commanded to emit the light based upon a timing sequence associated with a desired speed so that the road markers emit light in a strobe pattern. In this way, if a vehicle is traveling at the desired speed, then the strobe pattern appears static to a driver of the vehicle. Additionally, a message may be transmitted from a traffic authority to increase or decrease the timing sequence of the strobe pattern to increase or decrease the speed to the desired speed.

DETAILED DESCRIPTION

The word "example" or "exemplary" is used herein to mean "serving as an example, instance, or illustration." Any embodiment described herein as "exemplary" or "example" is not necessarily to be construed as preferred or advantageous over other embodiments or aspects.

Aspects of the invention relate to a system, apparatus, and method of utilizing a plurality of road markers to control vehicles speed. The method comprises: commanding road markers of a plurality of road markers to emit a light for a pre-determined amount of time; and commanding the road markers to emit the light based upon a timing sequence associated with a desired speed so that the road markers emit light in a strobe pattern, such that, if a vehicle is traveling at the desired speed, then the strobe pattern appears static to the driver of the vehicle. Further, a message from a traffic authority may increase or decrease the timing sequence of the strobe pattern to increase or decrease the speed to the desired speed.

In this way, if a vehicle is traveling at the desired speed, the strobe pattern appears to be static to the driver of the vehicle. On the other hand, if the vehicle is traveling above the desired speed, the strobe pattern appears to be coming towards the driver of the vehicle. Conversely, if the vehicle is traveling below the desired speed, the strobe pattern appears to be moving away from the driver of the vehicle. The term desired speed or speed may be hereinafter be referred to as "desired speed limit" or "speed limit".

Figure 1:
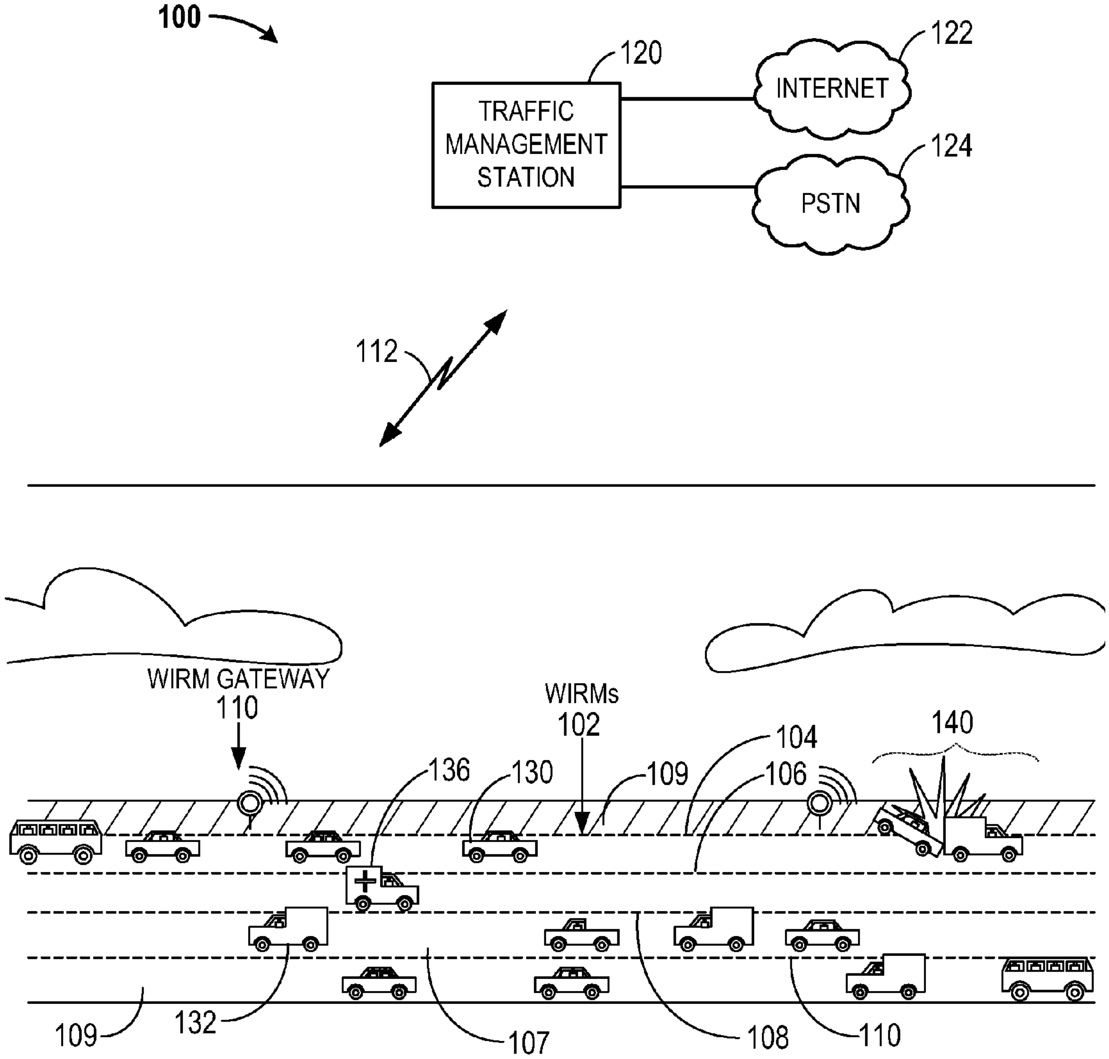
FIG. 1 is a system diagram in which aspects of the invention may be practiced.

With reference to FIG. 1, FIG. 1 is a system diagram in which aspects of the invention may be practiced. In one aspect, a vehicle speed control system 100 having a plurality of road markers 102 is disclosed. As one example, the road markers 102 may be wireless intelligent road markers (WIRMS) 102 and will hereinafter be referred to as WIRMS. As one example, WIRMS 102 may communicate messages with one another in combination with a plurality of WIRM gateways 110, a traffic management station 120, and traffic authorities. However, as will be described, in some aspects, WIRMS 102 may not communicate with one another and/or may be wired.

WIRMS 102 may be commanded to emit a light for a pre-determined or pre-set period of time. Further, WIRMS 102 may be used to emit a light based upon a timing sequence associated with a desired speed limit such that the WIRMS 102 emit light in a strobe pattern. In this way, if a vehicle 130 is traveling at the desired speed limit, then the strobe pattern appears static to a driver of the vehicle. Further, a message from a traffic authority (e.g., a traffic management station 120, an emergency vehicle 136, or from another authorized source) may increase or decrease the timing sequence of the strobe pattern to increase or decrease the speed limit to the desired speed limit.

As can be seen in FIG. 1, a highway is illustrated having a plurality of lanes 109 in which a plurality of vehicles—cars 130, trucks 132, buses, etc., and other vehicles are driving. As can be further seen in FIG. 1, each of the lanes 109 may have a corresponding group of WIRMS 104, 106, 108, and 110 that may be utilized to emit a strobe pattern to vehicles such that if a vehicle 130 is traveling at the desired speed limit, then the strobe pattern appears static to the driver of the vehicle. It should be noted that if the vehicle 130 is traveling above the desired speed limit, the strobe pattern appears to be coming towards the driver of the vehicle. On the other hand, if the vehicle 130 is traveling below the desired speed limit, the strobe pattern appears to moving away from the driver of the vehicle.

In one aspect, WIRMS 102 may communicate messages directly with one another (WIRM to WIRM), through a plurality of WIRM gateways 110, and through a link 112 to a traffic management station 120. WIRMS 102 may communicate with one another wirelessly or through wired connections. However, in some embodiments, WIRMS 102 may not communicate with one another and may only receive messages from a traffic authority (e.g., a traffic management station 120, an emergency vehicle 136, or from another authorized source).

In one example, traffic management station 120 may be connected to the Internet 122, the public switch telephone network (PSTN) 124, along with other data sources. In one aspect, a traffic authority may be: the traffic management station 120, an emergency vehicle 136, or another authorized source. In this example, the traffic authority may communicate with the WIRMS 102 to command the WIRMS to decrease the timing sequence of the strobe pattern to decrease the speed due to a changed roadway condition (e.g., minor traffic collision, major traffic collision, traffic congestion, bad weather, closed lane due to rock slide or mud slide, etc.). The traffic authority may be configured to communicate to WIRMS 102 through a WIRM gateway 110 or directly to the WIRMs 102. The traffic authority may be an emergency vehicle 136 or a traffic management station 120 or another type of traffic authority.

As one particular example, a WIRM 106 may receive a message from an emergency vehicle 136 (or based upon a message from the traffic management station 120 through a WIRM gateway 110 as reported by the emergency vehicle 136) that a minor traffic accident 140 has occurred that is at the side of the road and that strobe pattern should be decreased to 35 m.p.h. such that WIRMS 104 and 106 associated with that lane 109 are commanded to decrease the timing sequence for the strobe pattern to decrease the speed limit to a reduced desired speed limit of 35 m.p.h. In this way, vehicle drivers will reduce their vehicle 130 speeds because of the oncoming minor traffic collision 140. It should be appreciated that WIRMS 104 and 106 may communicate this reduced strobe pattern data message to one another directly or may receive the reduced strobe pattern data message from WIRM gateways 110 if they do not communicate with one another.

Thus, as examples, if the WIRMS 104, 106 communicate with one another, this reduced strobe pattern/speed limit message may be transmitted from the emergency vehicle 136 to the nearest WIRM 106, and thereafter on to other WIRMS 104 and 106, on a WIRM by WIRM basis, as well as to a WIRM gateway 110. In this way, the WIRMS 104 and 106 decrease the timing sequence for the strobe pattern to decrease the speed limit to a reduced desired speed limit of 35 m.p.h. Further, the emergency message may be transmitted to the WIRM gateway 110 via link 112 to the traffic management station 120 to indicate to the traffic management station 120 that a traffic accident 140 has occurred, the specific location of the traffic accident, as well as what portion of the lanes have had the WIRMS implement a decreased strobe pattern to bring down vehicle speed because of the traffic accident 140.

Alternatively, as previously described, if the WIRMs do no communicate with one another, the emergency vehicle 136 may transmit the accident message to the traffic management station 120 and the traffic management station 120 through the WIRM gateways 110 may transmit the reduced strobe pattern data to the appropriate WIRMS 104 and 106 to decrease the timing sequence for the strobe pattern to decrease the speed limit to a reduced desired speed limit of 35 m.p.h. Also, traffic authorities may also transmit messages to the WIRMS to increase the strobe pattern/speed limit back to the maximum desired speed limit, e.g., 55 m.p.h., after the traffic collision has been resolved.

In this way, WIRMS 102 may provide visual clues to drivers to enhance safety. In order to accomplish this, as previously described, the WIRMS 102 use lights that illuminate in a variety of strobe patterns to designate desired speeds. As one example, the WIRMS 102 may be used to emit light based upon a timing sequence associated with a desired speed limit such that the WIRMS 102 emit light in a strobe pattern, so that, if a vehicle is traveling at the desired speed limit, the strobe pattern appears static to a driver of the vehicle. It should be noted that if the vehicle 130 is traveling above the desired speed limit, the strobe pattern appears to be coming towards the driver of the vehicle. On the other hand, if the vehicle 130 is traveling below the desired speed limit, the strobe pattern appears to moving away from the driver of the vehicle. Therefore, the driver can easily identify that they are driving at the requested speed limit.

In one aspect, a light emission may include a light emission in a particular color to additionally identify a message to a driver. For example, a green strobing color may indicate a maximum speed limit (e.g., 55 mph), a yellow strobing color may indicate a reduced speed limit (e.g., 35 mph) due to minor situations (e.g., minor traffic collision, traffic congestion, bad weather, etc.) and a red color may indicate a very low speed limit (e.g., 10 mph) and eventual merging due to an emergency situation (e.g., major traffic collision, closed lane due to rock slide, mud slide, etc.). This may allow for an emergency to get to a major traffic collision.

Continuing with the previous example, a message from traffic management station 120 may decrease the timing sequence of the strobe pattern of the WIRMS 104, 106 for a lane 109 of traffic to decrease the speed limit to a desired speed limit (e.g., 35 m.p.h.) due to a minor traffic accident 140 at the side of the road. In this example, the light of the WIRMS 104, 106 providing the strobe pattern may be in a yellow color to indicate a minor situation (e.g., a minor traffic collision) has occurred to drivers and that the speed limit has therefore been slightly lowered. It should be appreciated that one or both sides of the lane—WIRMS 104 and/or 106 may utilize the strobing yellow color.

As previously described, the vehicle speed control system 100 includes a sequence of WIRMS 102 on (or near) the road (e.g., marking the edges of a lanes) in which each WIRM 102 may be capable of multiple visual states. The timing of the visual states of the WIRMS 102 may be controlled. The WIRMS 102 emit a light based upon a timing sequence associated with a desired speed limit such that the WIRMS 102 emit light in a strobe pattern, so that, if a vehicle 130 is traveling at the desired speed limit, then the strobe pattern appears static to the driver of the vehicle. Further, as previously described, the strobe pattern may be increased or decreased to increase or decrease the speed limit based upon messages from authorized traffic authorities (e.g., a traffic management station 120 or an emergency vehicle 136).

In one particular aspect, the timing of the visual states of the WIRMS 102 may be controlled in that the timing sequence for commanding each WIRM 102 to emit a light may be controlled such that if D represents the distance between two adjacent WIRMS 102, and the desired speed limit is S, then the light emission of a first WIRM occurs at a first time T1 and the light emission of a second WIRM occurs at a second time T2=(T1+D/S). Thus, the visual state of the WIRM at time T1 is identical to the visual state of the second WIRM at time T2. Therefore, if a vehicle 130 is traveling at the designated speed limit associated with the strobe pattern, then the pattern will appear static relative to the vehicle 130. In this way, the visual feedback provides a reference for the driver. In particular, by aiming to keep the driver driving at the same speed as the patterns (easily observed by the driver while keeping attention on the road), the driver may be assumed to be driving relatively safely at the desired speed limit. On the other hand, if the vehicle 130 is traveling at just above the speed limit, the driver will observe the pattern appearing to come towards the driver. Conversely, if the vehicle 130 is traveling at just below the speed limit, then the driver will observe the pattern appearing to go away from the driver. It should noted that in this example, D is representative of the distance down the middle of the lane between two adjacent WIRMS (i.e., D would be approximately equivalent to the measured distance between two perpendicular lines drawn through two adjacent WIRMS).

It should further be noted that in the scenario where lanes are curved, then the distance (D) is not the distance between the WIRMS themselves, but the distance between the WIRMS relative to the middle of the lane. Further, in this scenario, the strobe pattern may appear slightly faster down the outside of the curve to drivers and may appear slightly slower on the inside of the curve to drivers.

Additionally, as previously described, traffic authorities (e.g., an emergency vehicle 136, traffic management station 120, or another authorized source) may communicate with the WIRMS 102 to command the WIRMS 102 to increase or decrease the strobe pattern to increase or decrease the speed limit to control the flow of traffic and for reflecting changing road conditions (e.g., accidents, weather, rock slide, etc.). For example, the traffic authorities may communicate with the WIRMS 102 to command the WIRMS 102 to decrease the strobe patterns to decrease the speed limit in emergency situations for a lane of traffic (e.g. in the case of a traffic accident).

Figure 2:
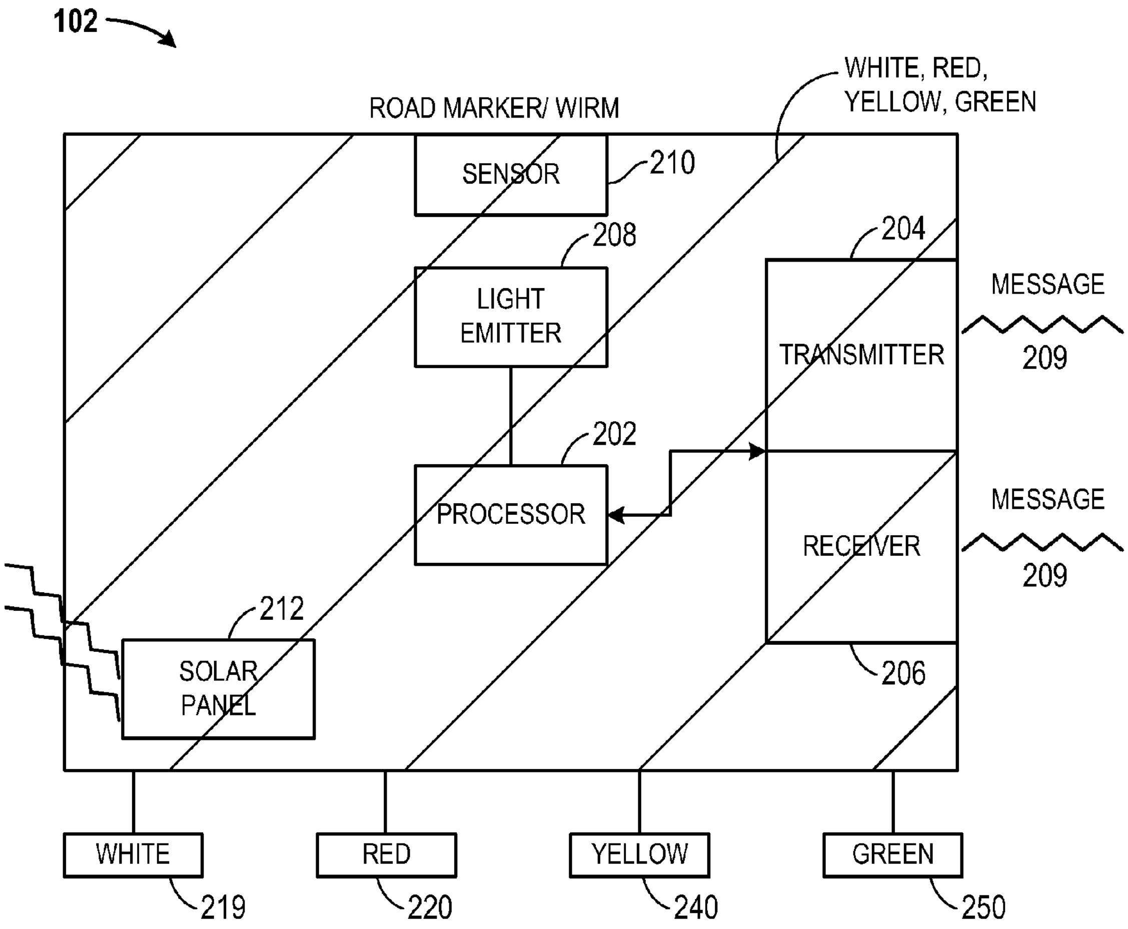
FIG. 2 is a block diagram of a wireless intelligent road marker (WIRM).

Particular examples of WIRMS 102, WIRM gateways 110, and a traffic management station 120 will be hereinafter described. With additional reference to FIG. 2, a block diagram of a WIRM 102, according to one aspect, is illustrated. A WIRM 102 may be used to communicate messages (transmit and receive messages) with other WIRMS 102 (e.g., status of strobe pattern) or may only receive messages from authorized traffic authorities. A WIRM 102 may comprise: one or more light emitters 208 (e.g., an LED) to emit a light color for a predetermined period of time (e.g. including different light colors: white 219, red 220, yellow 240, and green 250); a transmitter 204 to transmit a message 209; a receiver 206 to receive a message 209; and a processor 202. It should be appreciated that that the transmitter and receiver 204 and 206 may receive and transmit messages 209 to and from other WIRMS 102, WIRM gateways 110, and traffic authorities (such as emergency vehicles 136, traffic management station 120, as well as from other sources).

The processor 202 may be configured to command the light emitter 208 to emit a light for a pre-determined period of time. Also, the processor 202 may be configured to control emitting the light based upon a timing sequence associated with a desired speed limit so that the WIRM 102 emits the light in a strobe pattern with the other WIRMS 102, such that, if a vehicle is traveling at the desired speed limit, then the strobe pattern appears static to a driver of the vehicle, wherein, a message 209 from a traffic authority to increase or decrease the speed limit causes the processor 202 to increase or decrease the timing sequence of the strobe pattern to increase or decrease the speed limit to the desired speed limit.

WIRM 102 may be configured to operate in a wide variety of different fashions. The visual state, or when the light emitter 208 emits a light, may consist of a "light on" or "light off" implementation. Also, as previously described different types of colors may be utilized. However, the light emitter 208 may also utilize different types of visual states such as intermediate light intensities (e.g., lights slowly coming off and on). Further, reflectors may used for visual feedback. For example, instead of an LED, controlled reflectors may be utilized. As an example, the reflector may be an interfermotetric modulator display (imod). In this example, of utilizing a controlled reflector, the WIRM itself is not emitting light as such, but is instead controlling what colors are being reflected. Various light patterns may also be utilized by WIRMS 102. Simple periodic patterns may be utilized, as previously described. However, pseudo-random patterns based upon the period patterns may also be utilized.

In one aspect, WIRMS 102 may communicate messages with one another via transmitters and receivers 204 and 206 (WIRM to WIRM). WIRMS 102 may communicate with one another wirelessly or through wired connections. However, in some embodiments, WIRMS 102 may not communicate with one another and may only receive messages via receiver 206 from a traffic authority (e.g., a traffic management station 120, an emergency vehicle 136, or from another authorized source), as previously described. WIRMS 102 may individually process via processor 202 when to emit the light for the pre-determined period of time based upon the timing sequence associated with the desired speed limit such that the light emitter 208 emits the light in the strobe pattern with the other WIRMS. For example, this may be based upon a received transmission message 209 from an adjacent WIRM. However, the WIRMS 102 may simply incorporate a signal delay before light emitter 208 emits the light in the strobe pattern and then forward a transmission message 209 to an adjacent WIRM. In the embodiment, where WIRMS 102 do not communicate with one another, WIRMS 102 may individually process via processor 202 when to emit the light for the pre-determined period of time based upon the timing sequence associated with the desired speed limit such that the light emitter 208 emits the light in the strobe pattern with the other WIRMS based upon the received transmission message 209 from the traffic authority.

Therefore, in one aspect, processor 202 may be configured to command the light emitter 208 to emit a light based upon a message 209 (e.g., light emitted) received by the receiver 206 from another adjacent WIRM 102 such that the receiving WIRM then emits the light via the light emitter 208 to continue the desired strobe pattern and the desired speed limit in accordance with the timing sequence. Additionally, a WIRM 102 may receive a message 209 from a traffic authority 120 to increase or decrease the timing sequence of the strobe pattern to increase or decrease the speed limit to the desired speed limit WIRMS may or may not communicate with one another dependent upon the desired system implementation.

WIRMS 102 may also include a solar panel 212 to provide power to the WIRM 102. Also, WIRMS 102 may include a sensor 210, such as, an optical sensor or motion vibration sensor, to monitor vehicle traffic such that processor 202 may determine whether vehicle traffic is congested, and if so, processor 202 can command the transmitter 204 to transmit the monitor vehicle traffic congestion message 209 through a WIRM gateway 110 to the traffic management station 120. In this way, the traffic management station can pass the traffic congestion data onto Internet websites and into vehicles themselves such that traffic congestion is automatically and widely distributed. By utilizing the WIRMS to provide variable speed limits, congestion may be indicated (and accidents may be reduced by indicating traffic is stopped ahead by reducing the speed limit leading up to the accident). Congestion can also be reduced by controlling vehicle speed. If vehicles are slowed in certain sections, it can reduce the congestion in other areas.

It should be appreciated, that, in one aspect, WIRMS 102 communicate with one another through wireless or wired connections via messages 209. For example, each WIRM 102 may indicate to their adjacent WIRM 102 that it has performed a light emission such that the adjacent WIRM 102 can implement the timing sequence to then implement their light emission such that the strobe pattern occurs at the right frequency to implement the desired speed limit to drivers.

Further, the vehicle speed control system 100 may include many different types of processes to transmit messages 209 to increase or decrease the frequency of the strobe pattern to the WIRMS 102. For example, a message 209 may be transmitted from an emergency vehicle 136 to a WIRM 102, a WIRM gateway 110, and to the traffic management station 120.

As an example, an emergency vehicle 136 may have been notified about an accident (e.g., from police department based upon an x911 call) but was uncertain as to the location of the accident. As soon as the emergency vehicle 136 locates the accident 140, it transmits a message 209 to the nearest WIRM 102 to decrease the timing of the strobe pattern to decrease the speed limit (e.g., minor traffic accident on side of the road—reduce speed limit to 35 m.p.h.). That WIRM 102 transmits the message 209 to the next adjacent WIRM and each WIRM passes on the message to the other WIRMS such as, WIRMS 104 and WIRMS 106, along traffic lane 109. In this way, the frequency of the strobe pattern emitted by WIRMS 104 and WIRMS 106 along traffic lane 109 is brought to a reduced speed limit (e.g., 35 m.p.h.). Also, a yellow color, or some other color, may be emitted by the WIRMS 104 and 106 to indicate a minor traffic speed slow down.

It should be appreciated that the frequency of the strobe pattern emitted by WIRMS 102 along a traffic lane may be reduced in a gradual decreasing manner and/or increased in a gradual increasing manner. As an example, the frequency of the strobe pattern emitted by WIRMS 104 and WIRMS 106 along traffic lane 109 may be brought to a reduced speed limit (e.g., from 55 m.p.h. to 35 m.p.h.) in a gradual decreasing manner in response to the minor traffic collision. Similarly, the frequency of the strobe pattern emitted by WIRMS 102 along a traffic lane may likewise be increased in a gradual increasing manner. Continuing with the present example, the frequency of the strobe pattern emitted by WIRMS 104 and WIRMS 106 along traffic lane 109 may be brought to an increased speed limit (e.g., from 35 m.p.h. to 55 m.p.h.) in a gradual increasing manner after the minor traffic collision has been resolved.

Figure 7A:
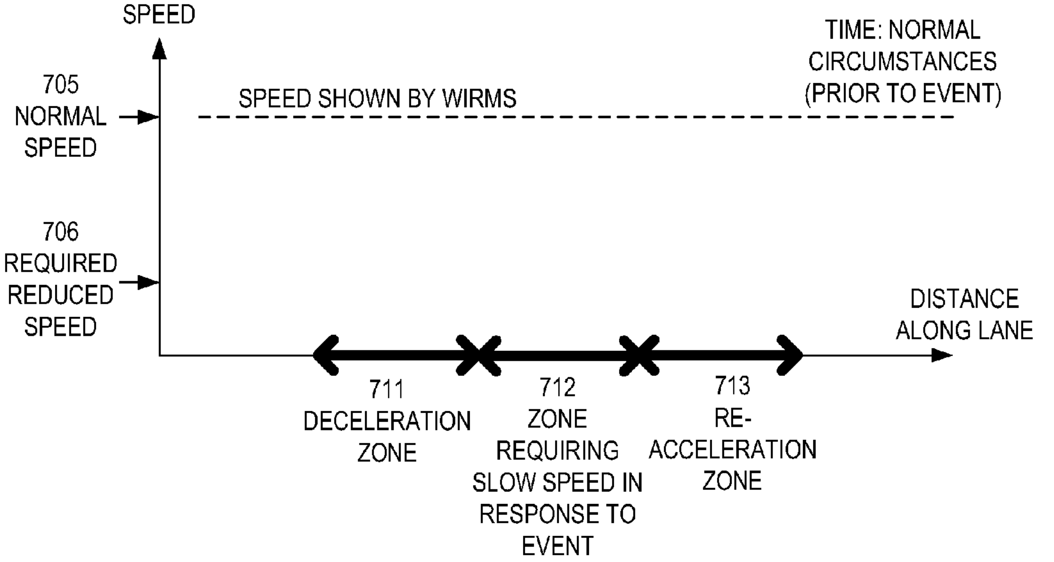
FIGS. 7A-7F are diagrams illustrating how the speeds indicated by the WIRMs may be gradually decreased and increased.

For example, FIGS. 7A-7F illustrate how this increase and decrease of speed may occur. These diagrams describe a segment of a road lane and show the speed indicated by the strobe pattern of the WIRMS (y-axis) graphed against the distance along that segment of road lane (x-axis). FIG. 7A shows the speed indicated by the WIRMS during normal circumstances—in this case the speed along the segment of the road lane has a uniform normal speed 705.

FIGS. 7B-7E illustrate how the speed indicated by the frequency of the strobe pattern emitted by the WIRMS can be changed in response to an event, where, as an example, an event could be scheduled road maintenance, a traffic incident, or some other event, warranting slowing the traffic in a zone 712 to a slower speed 706. It would be beneficial to gradually slow the speed of the traffic from the normal speed 705 to the reduced speed 706 over a zone 711 of the road before zone 712, and then gradually increase the speed of the traffic from the reduced speed 706 to the normal speed 705 over a zone 713 of road after zone 712.

Figure 7B:
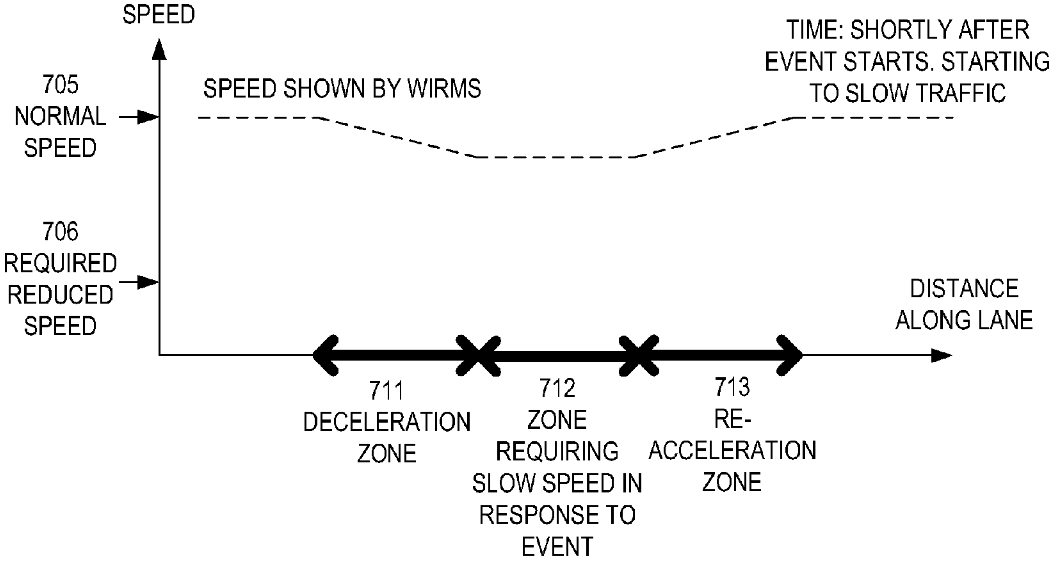

FIG. 7B shows the speed indicated by frequency of the strobe pattern emitted by the WIRMs shortly after the event begins. The speed indicated in zone 712 has been reduced slightly. The WIRMS in zone 712 indicate a slightly reduced speed, but the speed has not reached the required reduced speed 706. Note that in FIGS. 7B-7E, the WIRMS in zone 711 indicate the normal speed 705 at the start of zone 711, and then gradually reduce the speed over the distance of the zone 711 to the current reduced speed indicated in zone 712. The WIRMS in zone 713 indicate the current speed indicated in zone 712 from the start of zone 713, and then the indicated speeds are gradually increased over the distance of the zone 713 to the normal speed 705.

Figure 7C:
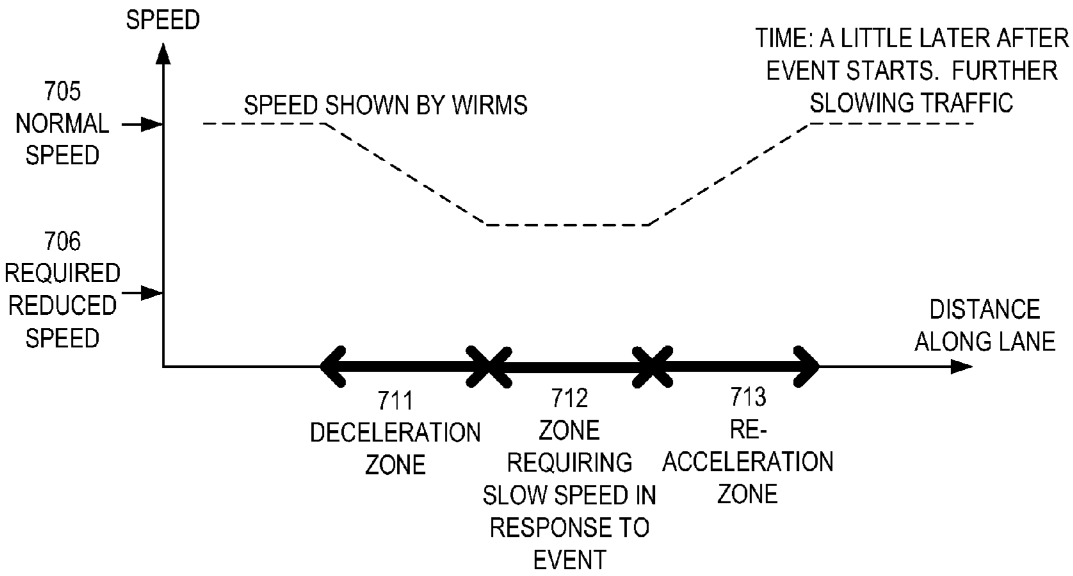
Figure 7D:
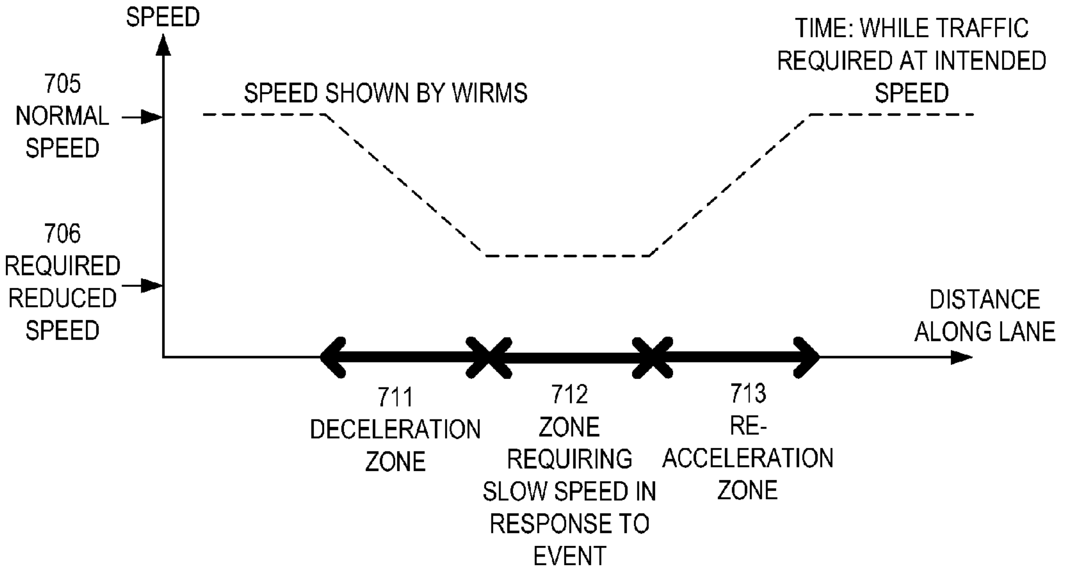
Figure 7E:
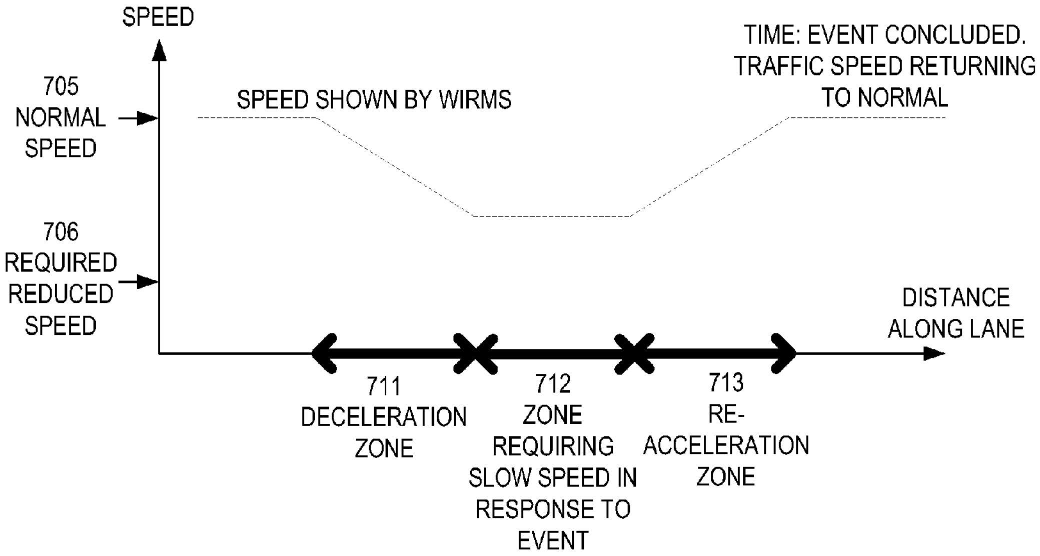
Figure 7F:
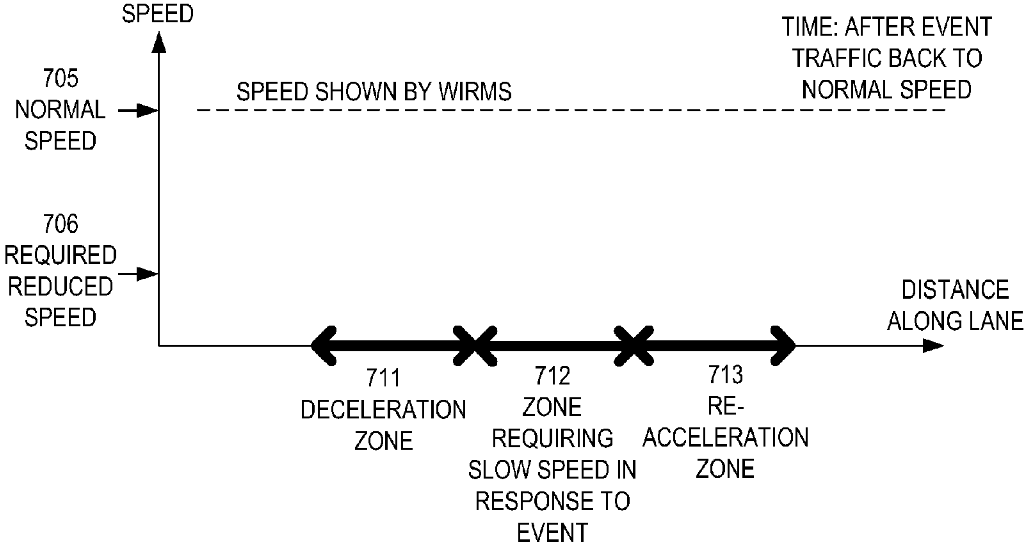

FIG. 7C shows the speed indicated by frequency of the strobe pattern emitted by the WIRMs shortly after FIG. 7B, but before the speed indicated in zone 711 has reached the required reduced speed 706. FIG. 7D shows the speed indicated by frequency of the strobe pattern emitted by the WIRMs once the speed indicated in zone 711 has reached the required reduced speed 706. FIG. 7E shows the speed indicated by frequency of the strobe pattern emitted by the WIRMs shortly after the event concludes. The speed indicated in zone 712 has increased slightly from the required reduced speed 706, but has not reached the normal speed 705. FIG. 7F shows that the speed indicated by frequency of the strobe pattern emitted by the WIRMs has returned to the uniformly normal speed 705 for that segment of the road.

It should be noted that a gradual increase or decrease of speed indicated by frequency of the strobe pattern emitted by the WIRMs can also be used to transition the speed of traffic at locations where the speed limit normally changes from one speed to another in a similar manner to the previous description. In one example, if the speed limit changes from 55 m.p.h to 35 m.p.h at a particular location, then the speed indicated by frequency of the strobe pattern emitted by the WIRMs can change gradually from 55 m.p.h to 35 m.p.h over a segment of road at that location. Further, if the speed limit changes from 35 m.p.h to 55 m.p.h at a particular location, then the speed indicated by frequency of the strobe pattern emitted by the WIRMs can change gradually from 35 m.p.h to 55 m.p.h over a segment of road at that location.

Referring again to FIGS. 1 and 2, a message 209 may also be transmitted from the emergency vehicle 136 to the nearest WIRM gateway 110 and by the WIRM gateway 110 through wireless link 112 to the traffic management station 120 in order to identify an accident, an accident location, as well as the type of accident. WIRM sensors might also identify the location of the accident.

As another example, a random vehicle may see a minor accident 140 and either directly call the traffic management station 120 or the traffic management station 120 may be notified by a vehicle's call to x911 and the traffic management station 120 via link 112 may transmit a message 209 to reduce the strobe pattern/speed to 35 m.p.h. to WIRM gateway 110 and the WIRM gateway 110 may then transmit this message 209 to a WIRM 104 or multiple WIRMS 104 and 106. The WIRMS 104 and 106 may then communicate messages 209 to one another to decrease the frequency of the strobe pattern to a desired reduced strobe pattern/speed limit of 35 m.p.h. and may emit a yellow color.

Figure 3:
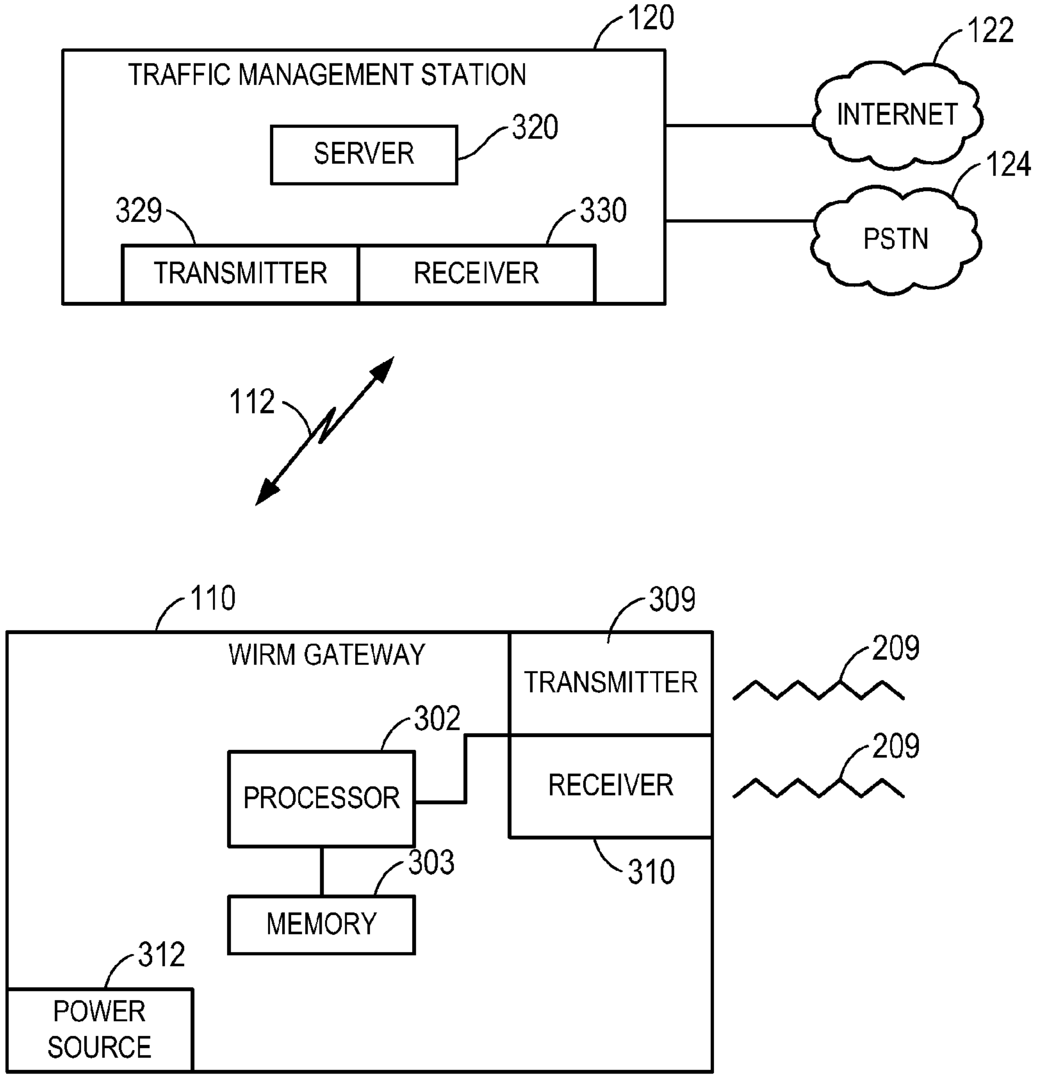
FIG. 3 is a block diagram illustrating the components of a WIRM gateway and a traffic management station.

Turning briefly to FIG. 3, FIG. 3 is a block diagram illustrating the components of the WIRM gateway 110 and the traffic management station 120 that may be utilized by vehicle speed control system 100. In one aspect, WIRM gateway 110 may include a processor 302, memory 303, transmitter 309, receiver 310, and power source 312. Transmitter 309 may transmit messages 209 via transmitter 309 to WIRMS 102, emergency vehicles 136 and to traffic management station 120 via link 112; and may receive messages 209 via receiver 310 from WIRMS 102, emergency vehicles 136, and from traffic management station 120 via link 112. WIRM gateway 110 may have multiple transmitters and receivers. For example, one to the outside world, and one to the WIRMS 102. Further, a transmitter/receiver to vehicles may be a different type of transmitter/receiver implementation. For example, implementations such as: Bluetooth/zigbee to WIRMS, 801.11 to vehicles, and cellular transmission for the backhaul; may be utilized.

Further, the traffic management station 120 may include a server 320, a transmitter 329, and a receiver 330. Traffic management station 120 may be connected to the Internet 122 and the public switch telephone network (PSTN) 124. Traffic management station 120 may receive emergency data from callers, vehicles, emergency vehicles, the Internet or a wide variety of different sources, and may transmit these messages via link 112 to a WIRM gateway 110 such that WIRM gateway 110 can pass on these messages to WIRMS 102 to decrease the strobe pattern/speed limit of the WIRMS 102 to address the dynamic change in road conditions. Additionally, as previously described, traffic management station 120 via receiver 330 may receive via link 112 messages from the WIRM gateways 110.

As an example, as previously described with reference to FIG. 1, in traffic lane 109, a minor vehicle collision 140 may occur that is at the side of the lane. For a particular pre-defined distance, WIRMS 104 and 106 may be commanded to emit a strobe pattern with a decreased timing sequence such that the strobe pattern is decreased to implement a lower speed limit (e.g., with a yellow color (or some other color) and to a decreased speed limit of 35 m.p.h.) to indicate to drivers of vehicles 130 that they should decrease their speed. The WIRMS 104 and 106 may be commanded to decrease the speed limit by a traffic authority, such as, emergency vehicle 136 or traffic management station 120. This further aids in an emergency vehicles getting to the traffic collision. In particular, the processor 202 of the WIRMS 102 may implement the decreased timing sequence for the strobe pattern to decrease the speed limit to the desired speed limit. Of course, after the traffic collision has been resolved, processor 202 of WIRMS 104 and 106 may be commanded to implement an increased timing sequence for the strobe pattern to emit a strobe pattern with an increased timing sequence such that the strobe pattern is increased to implement a normal speed limit (e.g., with a white color and to a normal speed limit of 55 m.p.h.) to indicate to drivers of vehicles 130 that they should return to their normal speed.

Other instances in which a traffic authority may send messages to the WIRMS 102 to decrease the timing sequence in the strobe pattern to decrease the speed limit include such things as: traffic collisions, traffic congestion, bad weather, closed lane due to rock slide, mud slide, etc. Further, these decreased strobe pattern frequencies to decrease speed limits may also utilize different colors such as: red, yellow, green, etc.

Therefore, each of the lanes 109 may have a corresponding group of WIRMS 104, 106, 108 and 110 that each include a processor 202 to: command a light emitter 208 to emit a light for pre-determined period of time; and to control the emitting of light by the light emitter 208 based upon timing sequence associated with a desired speed limit such that the WIRMS emit the light in a strobe pattern with the other WIRMS. In this way, the WIRMS may be utilized to emit strobe patterns of different frequencies (e.g., different speeds) and in different colors (e.g., white 219, red 220, yellow 240, green 250) to advise drivers of vehicles 130 of traffic accidents, bad weather, road/lane problems, traffic congestion, etc., to decrease their speed. Of course, green lights may be used to indicate to drivers that there are no problems currently associated with the lane 109 and may correspond to the desired speed limit shown by the strobe pattern.

Figure 4:
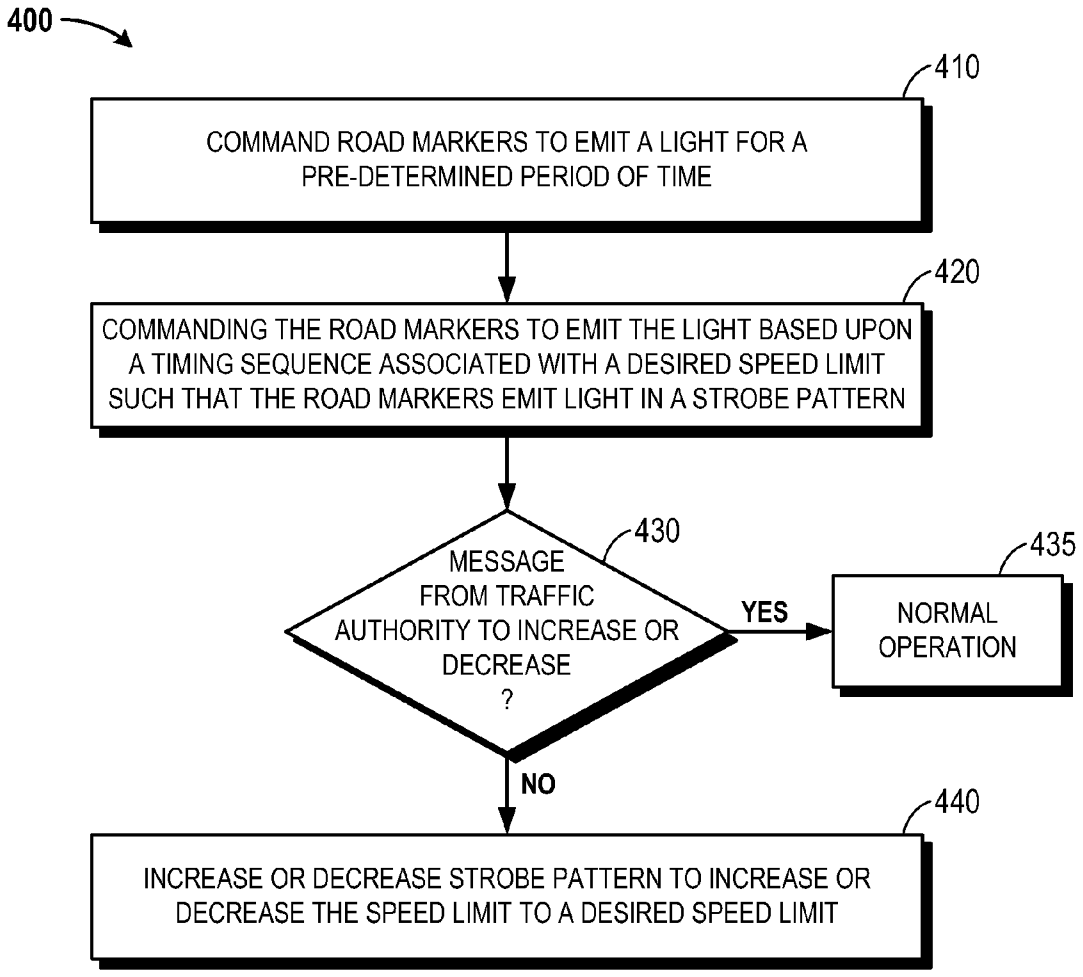
FIG. 4 is a flow diagram that illustrates a process to implement a strobe pattern for WIRMS.

With brief reference to FIG. 4, a flow diagram that illustrates a process 400 to implement a strobe pattern for WIRMS 102, as previously described, according to one aspect, will be described. At block 410, the WIRMS are commanded to emit a light for a pre-determined amount of time. At block 420, WIRMS are commanded to emit light based on a timing sequence associated with a desired speed limit such that WIRMS emit light in a strobe pattern associated with the desired speed limit. In this way, if a vehicle is traveling at the desired speed limit, the strobe pattern appears static to a driver of the vehicle. Next, at decision block 430, it is determined whether a message from the traffic authority to increase or decrease the timing sequence of the strobe pattern to increase or decrease the speed limit to a new desired speed limit has been transmitted and received. If not, normal operation occurs (block 435). However, if such a message has been transmitted by a traffic authority, the strobe pattern is increased or decreased by increasing or decreasing the timing sequence at each associated WIRM to increase or decrease the speed limit. As previously, described this functionality may be implemented by a WIRM 102 including a processor 202, light emitter 208, transmitter 204, and receiver 206, etc.

Figure 5:
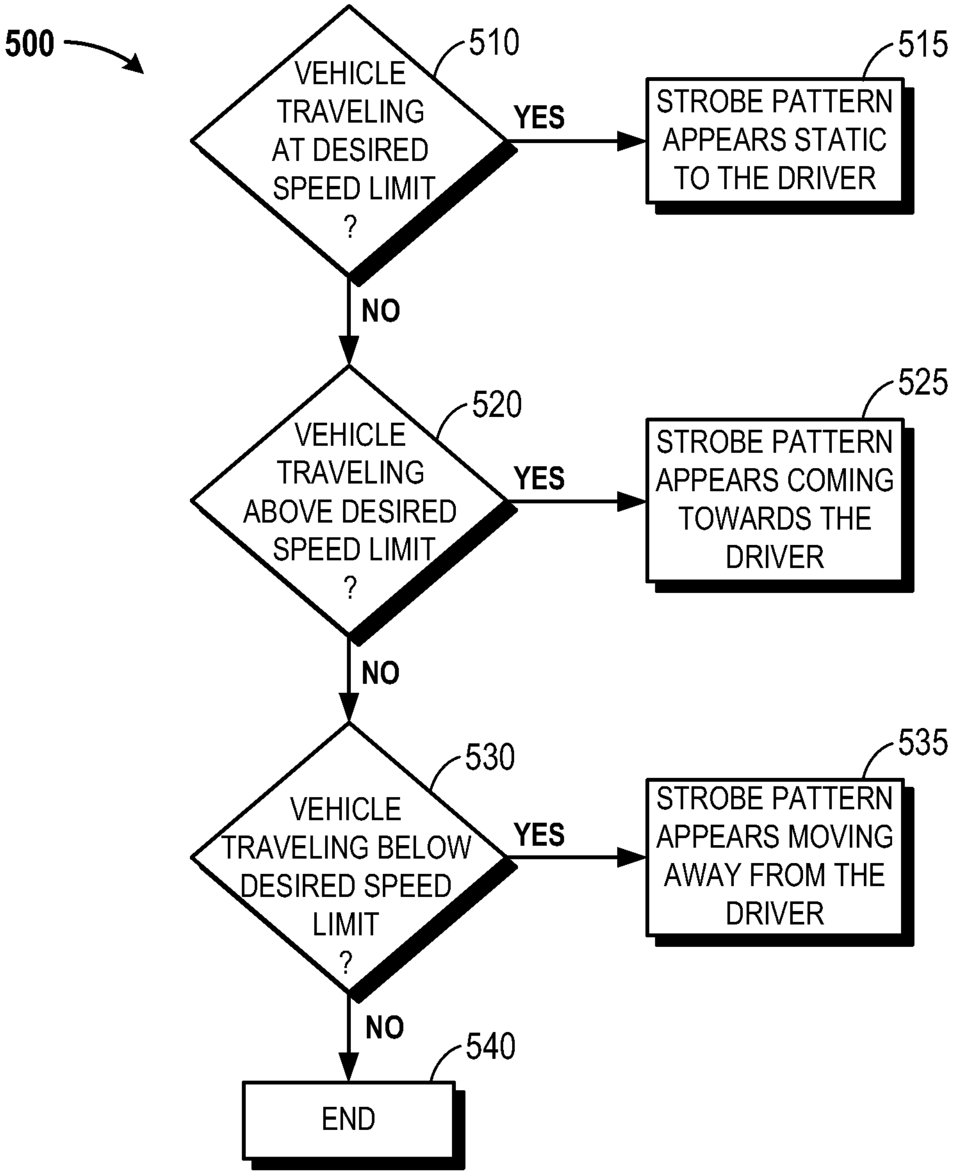
FIG. 5 is a flow diagram that illustrates a process that shows how the strobe pattern may appear to drivers of vehicles.

With brief reference to FIG. 5, a flow diagram that illustrates a process 500 that shows how the strobe pattern may appear to drivers of vehicles 130 is described. If, at block 510, the vehicle is traveling at the desired speed limit, then at block 515 the strobe pattern appears static to the driver. If not, at block 520, if the vehicle is traveling above the desired speed limit, then the strobe pattern appears to be coming towards the driver (block 525). If not, and the vehicle is traveling below the desired speed limit, then the strobe pattern appears to be moving away from the driver (block 535).

Figure 6:
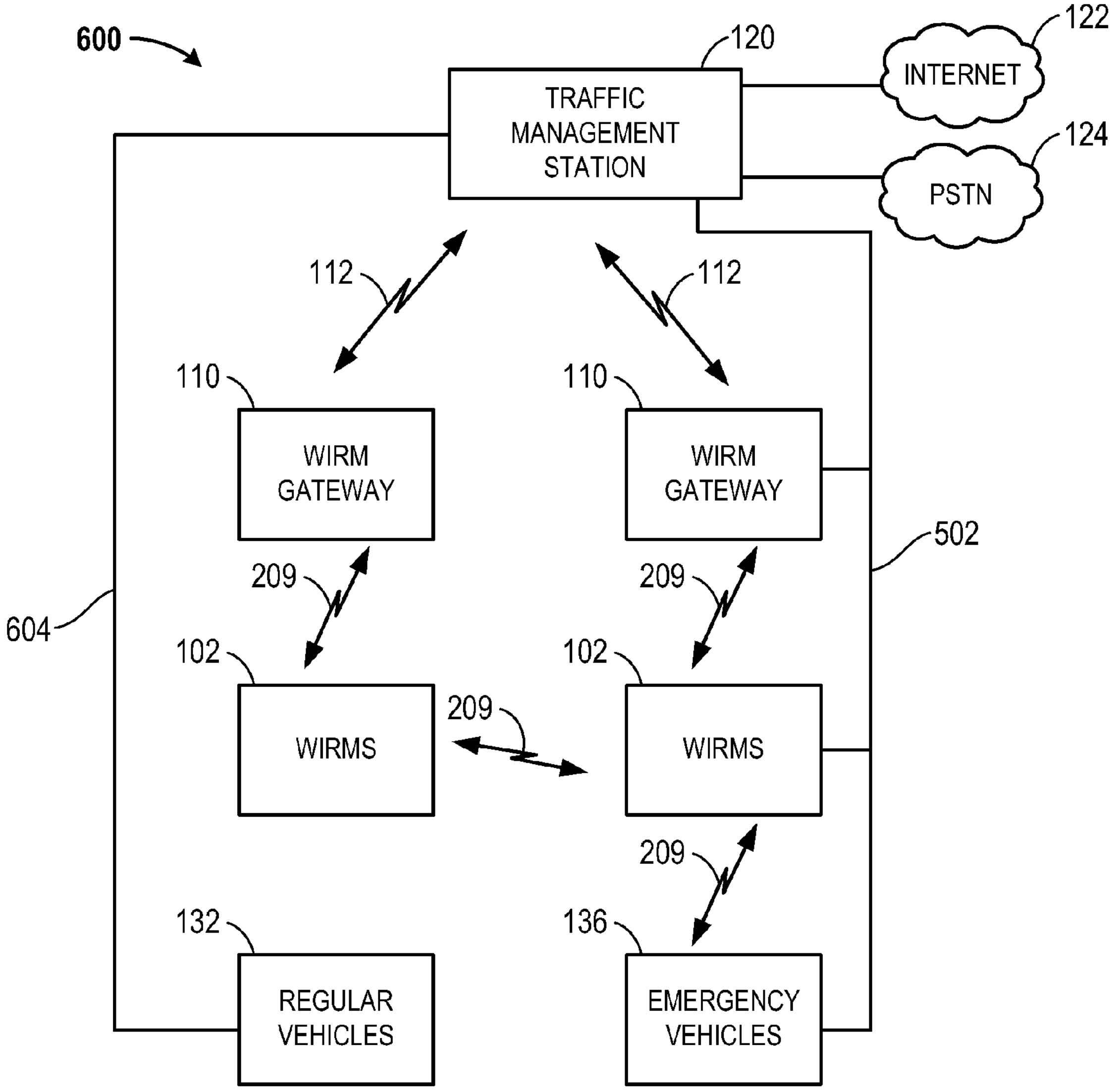
FIG. 6 is a block diagram showing a complete vehicle speed control system.

With reference to FIG. 6, a block diagram showing a vehicle speed control system 600, according to one aspect, is shown. As can be seen in FIG. 6, in addition to FIG. 1 and the other figures, emergency vehicles 136 can correspond via wireless link 209 to WIRMS 102 and through wireless link 602 to WIRM gateways 110 and the traffic management station 120. Further, regular vehicles 132 (e.g., via a cellphone) may communicate via a wireless link 604 to the traffic management station 120. Additionally, other drivers, persons, vehicles, etc., can communicate with the traffic management station 120 via the Internet 120, the PSTN 124, or by other means. For example, a x911 call to a police or fire station (or the information from a call) may be passed onto the traffic management station 120. It should be appreciated that vehicles that communicate information not only include on-the-road vehicles but may also include off-the-road vehicles such as helicopters, planes, etc.

Additionally, as previously described, WIRMS 102 may communicate messages 209 with each other and to the WIRM gateways 110 and the WIRM gateways 110 may further communicate with the traffic management station 120. Conversely, the traffic management station 120 may communicate messages via link 112 to the WIRM gateways 110 and WIRMS 102.

Thus, as one example, to implement the WIRM vehicle speed control system 600, three main components may be utilized: the WIRMS 102, WIRM gateways 110, and the traffic management station 120. As an example, the WIRMS 102 may communicate with each other utilizing low-power wireless network technology via wireless messages 209. The WIRMS 102 may be self-powering (e.g. using solar energy or thermal heat transfer), and this energy may be sufficient to power the LED lights highlighting the location and the strobe pattern for the desired speed limit to drivers 130. As previously discussed, the WIRMS 102 may be remotely instructed to provide a variety of lighting strobe patterns, colors, flashes, etc. Also, as previously described, a WIRM 102 may have additional capabilities enabling the WIRM 102 to provide traffic monitoring information to the traffic management station 120.

Further, WIRM gateways 110 may be installed beside the highway. The WIRM gateways 110 may communicate with the WIRMS 102 and may communicate with the traffic management station 120 via WWAN (or other similar technologies). In essence, these devices facilitate communication between the WIRMS 102 and the traffic management station 120. The WIRM gateways 110 may require more power than a small solar-cell provides such that WIRM gateways, in one embodiment, may utilize a large solar panel such as those used by road-side emergency phones.

The traffic management station 120 may include an appropriate system that includes sufficient hardware and software (e.g. servers, computers, phone lines, etc.) to provide an operations and service center. The traffic management station 120 in conjunction with the WIRM gateways 110 may provide instructions (e.g., desired timing sequences to institute a strobe pattern for a desired speed limit) to the WIRMS 102 and also receive data observed by the WIRMS 102. The traffic management station 120 also may provide services to external systems. Examples of such services include providing traffic recommendations to vehicle GPS navigation units or supporting a traffic-monitoring web-site via the Internet 122.

The WIRMS 102 may provide visual cues to drivers to enhance safety. In order to accomplish this, as previously described, the WIRMS 102 use lights illuminating in a variety of strobe patterns as implemented via processor 202 and light emitter 208, as previously described. Thus, the WIRMS 102 may be used to emit light based upon a timing sequence associated with a desired speed limit such that the WIRMS 102 emit light in a strobe pattern, such that, if a vehicle is traveling at the desired speed limit, then the strobe pattern appears static to a driver of the vehicle.

As one example, a message from a traffic management station 120 may decrease the timing sequence of the strobe pattern of the WIRMS 104, 106 of a lane 109 of traffic to decrease the speed limit to a desired speed limit due to a minor traffic accident 140 at the side of the road. For example, the strobe pattern may be decreased to indicate a reduced speed limit (e.g., 35 mph). It should be appreciated that the light emission may include a light emission in a particular color to additionally identify a message to a driver. For example, a green strobing color may indicate a maximum speed limit (e.g., 55 mph), a yellow strobing color may indicate a reduced speed limit (e.g., 35 mph) due to minor situations (e.g., minor traffic collision, traffic congestion, bad weather, etc.) and a red color may indicate a very low speed limit (e.g., 10 mph) and eventual merging due to an emergency situation (e.g., major traffic collision, closed lane due to rock slide, mud slide, etc.). This may assist an emergency vehicle to get to a major traffic collision.

Additionally, by controlling the WIRM system centrally (e.g. utilizing traffic management station 120), it may be used for deterring traffic and/or highlighting bad weather conditions. During peak traffic times, special events, a WIRM system may be used to reduce traffic speed, reconfigure lane direction and divert traffic. Integration with traffic signals could intelligently aid flow. Such a system would be more configurable than current manual approaches. Safety zones including train zones, pedestrian zones, school zones, and bike paths may be illuminated to reduce speed or stop traffic when crossing traffic is present.

It should be appreciated that embodiments of the invention previously described may be implemented in conjunction with the execution of instructions by processors (e.g., processors of the WIRMs 102, WIRM gateways 110, and the traffic management station 120) and/or other circuitry and/or other devices. Particularly, this circuitry, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry. Further, it should be appreciated that the terms processor, microprocessor, circuitry, controller, etc., refer to any type of logic or circuitry capable of executing logic, commands, instructions, software, firmware, functionality, etc.

Further, the WIRMs 102, WIRM gateways 110, and the traffic management station 120 may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), an entertainment device, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device (also referred to as a base station) may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of utilizing a plurality of road markers to control vehicle speeds comprising:

commanding road markers of the plurality of road markers to emit a light for a pre-determined period of time; and controlling the commanding of the road markers to emit the light based upon a timing sequence associated with a desired speed such that the road markers emit light in a strobe pattern, such that, if a vehicle is traveling at the desired speed, then the strobe pattern appears static to a driver of the vehicle, wherein, a message from a traffic authority increases or decreases the timing sequence of the strobe pattern to increase or decrease the speed to the desired speed, wherein each of the road markers individually processes via a processor when to emit the light for the pre-determined period of time such that the road markers emit the light in the strobe pattern based upon the message from the traffic authority.

2. The method of claim 1, wherein, if the vehicle is traveling above the desired speed, the strobe pattern appears to be coming towards the driver of the vehicle.

3. The method of claim 1, wherein, if the vehicle is traveling below the desired speed, the strobe pattern appears to be moving away from the driver of the vehicle.

4. The method of claim 1, wherein, the timing sequence for commanding each road marker to emit a light is controlled such that if D represents the distance between two adjacent road markers, and the desired speed is S, then the light emission of a first road marker occurs at a first time T1 and the light emission of a second adjacent road marker occurs at a second time T2=(T1+D/S).

5. The method of claim 4, wherein the distance (D) is approximately equal to a measured distance along a middle of a lane between a pair of perpendicular lines drawn through adjacent road markers.

6. The method of claim 1, wherein, the traffic authority includes at least one of an emergency vehicle or a traffic management station.

7. The method of claim 6, wherein, the traffic authority is configured to communicate with the road markers to command the road markers to decrease the timing sequence of the strobe pattern to decrease the speed.

8. The method of claim 7, wherein, the traffic authority is configured to communicate to road markers through a road marker gateway.

9. The method of claim 1, wherein a light emission includes a light emission of a particular color to identify a message to a driver.

10. The method of claim 9, wherein, a green color indicates a maximum speed, a yellow color indicates a reduced speed, and a red color indicates a very low speed due to an emergency situation.

11. The method of claim 1, wherein, the road markers communicate with one another through wireless connections, wherein each road marker indicates to their adjacent road marker that it has performed a light emission.

12. The method of claim 1, wherein, the road markers communicate with one another through wired connections, wherein each road marker indicates to their adjacent road marker that it has performed a light emission.

13. The method of claim 1, wherein the light emission is generated by an LED or a reflector.

14. A road marker to control vehicle speeds comprising:

a light emitter to emit a light;

a transmitter;

a receiver to receive a message; and a processor to:

command the light emitter to emit a light for a pre-determined period of time;

control emitting the light based upon a timing sequence associated with a desired speed such that a road marker emits the light in a strobe pattern with other road markers, such that, if a vehicle is traveling at the desired speed, then the strobe pattern appears static to a driver of the vehicle, wherein, a message from a traffic authority increases or decreases the timing sequence of the strobe pattern to increase or decrease the speed to the desired speed; and process individually when to emit the light for the pre-determined period of time such that the road marker emits the light in the strobe pattern with other road markers based upon the message from the traffic authority.

15. The road marker of claim 14, wherein, if the vehicle is traveling above the desired speed, the strobe pattern appears to be coming towards the driver of the vehicle.

16. The road marker of claim 14, wherein, if the vehicle is traveling below the desired speed, the strobe pattern appears to be moving away from the driver of the vehicle.

17. The road marker of claim 14, wherein, the timing sequence for commanding each road marker to emit a light is controlled such that if D represents the distance between two adjacent road markers, and the desired speed is S, then the light emission of a first road marker occurs at a first time T1 and the light emission of a second adjacent road marker occurs at a second time T2=(T1+D/S).

18. The road marker of claim 17, wherein the distance (D) is approximately equal to a measured distance along a middle of a lane between a pair of perpendicular lines drawn through adjacent road markers.

19. The road marker of claim 14, wherein, the traffic authority includes at least one of an emergency vehicle or a traffic management station.

20. The road marker of claim 19, wherein, the traffic authority is configured to communicate with the road markers to command the road markers to decrease the timing sequence of the strobe pattern to decrease the speed.

21. The road marker of claim 20, wherein, the traffic authority is configured to communicate to road markers through a road marker gateway.

22. The road marker of claim 14, wherein the light emitter emits a light of a particular color to identify a message to a driver.

23. The road marker of claim 22, wherein, a green color indicates a maximum speed, a yellow color indicates a reduced speed, and a red color indicates a very low speed due to an emergency situation.

24. The road marker of claim 14, wherein, the road markers communicate messages with one another through wireless connections through respective transmitters and receivers, wherein the message from a road marker to an adjacent road marker indicates to the adjacent road marker that it has performed a light emission.

25. The road marker of claim 14, wherein, the road markers communicate messages with one another through wired connections through respective transmitters and receivers, wherein the message from a road marker to an adjacent road marker indicates to the adjacent road marker that it has performed a light emission.

26. The road marker of claim 14, wherein the light emitter is an LED or a reflector.

27. A road marker to control vehicle speeds comprising:

means for receiving a message;

means for commanding emitting a light for a pre-determined period of time;

means for controlling emitting the light based upon a timing sequence associated with a desired speed such that a road marker emits the light in a strobe pattern with other road markers, such that, if a vehicle is traveling at the desired speed, then the strobe pattern appears static to a driver of the vehicle, wherein, a message from a traffic authority increases or decreases the timing sequence of the strobe pattern to increase or decrease the speed to the desired speed; and means for processing individually when to emit the light for the pre-determined period of time such that the road marker emits the light in the strobe pattern with other road markers based upon the message from the traffic authority.

28. The road marker of claim 27, wherein, if the vehicle is traveling above the desired speed, the strobe pattern appears to be coming towards the driver of the vehicle.

29. The road marker of claim 27, wherein, if the vehicle is traveling below the desired speed, the strobe pattern appears to be moving away from the driver of the vehicle.

30. The road marker of claim 27, wherein, the timing sequence for commanding each road marker to emit a light is controlled such that if D represents the distance between two adjacent road markers, and the desired speed is S, then the light emission of a first road marker occurs at a first time T1 and the light emission of a second adjacent road marker occurs at a second time T2=(T1+D/S).

31. The road marker of claim 30, wherein the distance (D) is approximately equal to a measured distance along a middle of a lane between a pair of perpendicular lines drawn through adjacent road markers.

32. The road marker of claim 27, wherein, the traffic authority includes at least one of an emergency vehicle or a traffic management station.

33. The road marker of claim 32, wherein, the traffic authority is configured to communicate with the road markers to command the road markers to decrease the timing sequence of the strobe pattern to decrease the speed.

34. The road marker of claim 27, wherein the means for emitting a light emits a light of a particular color to identify a message to a driver.

35. The road marker of claim 27, wherein the means for emitting a light is an LED or a reflector.

36. A computer program product comprising:

a computer-readable medium comprising code for:

receiving a message;

controlling emitting a light for a pre-determined period of time;

controlling emitting the light based upon a timing sequence associated with a desired speed such that a road marker emits the light in a strobe pattern with other road markers, such that, if a vehicle is traveling at the desired speed, then the strobe pattern appears static to a driver of the vehicle, wherein, a message from a traffic authority increases or decreases the timing sequence of the strobe pattern to increase or decrease the speed to the desired speed; and processing individually when to emit the light for the pre-determined period of time such that the road marker emits the light in the strobe pattern with other road markers based upon the message from the traffic authority.

37. The computer program product of claim 36, wherein, if the vehicle is traveling above the desired speed, the strobe pattern appears to be coming towards the driver of the vehicle.

38. The computer program product of claim 36, wherein, if the vehicle is traveling below the desired speed, the strobe pattern appears to be moving away from the driver of the vehicle.

39. The computer program product of claim 36, wherein, the timing sequence for commanding each road marker to emit a light is controlled such that if D represents the distance between two adjacent road markers, and the desired speed is S, then the light emission of a first road marker occurs at a first time T1 and the light emission of a second adjacent road marker at a second time T2=(T1+D/S).

40. The computer program product of claim 39, wherein the distance (D) is approximately equal to a measured distance along a middle of a lane between a pair of perpendicular lines drawn through adjacent road markers.

41. The computer program product of claim 36, wherein, the traffic authority includes at least one of an emergency vehicle or a traffic management station.

42. The computer program product of claim 41, wherein, the traffic authority is configured to communicate with the road markers to command the road markers to decrease the timing sequence of the strobe pattern to decrease the speed.

43. The computer program product of claim 36, wherein the light emission is generated by an LED or a reflector.

* * * * *